United States Patent

Hums et al.

[11] Patent Number: 5,904,040
[45] Date of Patent: May 18, 1999

[54] GAS TURBINE FOR THE COMBUSTION OF REFORMED FUEL GAS

[75] Inventors: Erich Hums, Hessdorf; Nicolas Vortmeyer, Essen, both of Germany

[73] Assignee: Siemens Aktiengesellschaft, Munich, Germany

[21] Appl. No.: 08/990,033

[22] Filed: Dec. 12, 1997

Related U.S. Application Data

[63] Continuation of application No. PCT/DE96/01018, Jun. 11, 1996.

[51] Int. Cl.$^6$ .................................................. F02C 3/22
[52] U.S. Cl. .................................... 60/39.465; 60/723
[58] Field of Search ................. 60/39.12, 723, 60/39.461, 39.463, 39.465

[56] References Cited

U.S. PATENT DOCUMENTS

| | | | |
|---|---|---|---|
| 2,839,892 | 6/1958 | Rosenthal | 60/723 |
| 4,202,169 | 5/1980 | Acheson et al. | |
| 4,519,992 | 5/1985 | Alkhazov et al. | |
| 5,048,284 | 9/1991 | Lywood et al. | |
| 5,729,967 | 3/1998 | Joos et al. | 60/723 |

FOREIGN PATENT DOCUMENTS

| | | |
|---|---|---|
| 209128 | 1/1924 | United Kingdom . |
| 2 268 694 | 1/1994 | United Kingdom . |

OTHER PUBLICATIONS

"Gas Turbines and Gas Turbine Power Plants", Power for Generations, Siemens, pp. 1–20.
Japanese Patent Abstract No. 61053425 (Takafumi), dated Mar. 17, 1986.

Primary Examiner—Louis J. Casaregola
Attorney, Agent, or Firm—Herbert L. Lerner; Laurence A. Greenberg

[57] ABSTRACT

A gas turbine can achieve comparatively low emissions of nitrogen oxide. One disadvantage particularly of a catalytic combustion chamber is that, for example for natural gas, the ignition temperature necessary for combustion is in the region of about 400 ° C. The use of an auxiliary burner, which constitutes a disadvantageous source of nitrogen oxide, has therefore been heretofore unavoidable. In order to eliminate that disadvantage, a gas turbine for the combustion of a fuel gas, particularly with catalytic combustion of the fuel gas, includes a conduit system for drawing off part of the fuel gas, guiding it through a catalytic preforming stage to convert a hydrocarbon contained in the fuel gas into an alcohol and/or an aldehyde and subsequently feeding it to the fuel gas again in order to lower its ignition temperature. In this way, the comparatively easily igniting fuels alcohol and/or aldehyde are obtained from the fuel gas in the preforming stage. A fuel gas intermixed with these materials therefore ignites at a considerably lower ignition temperature than a fuel gas without preformed constituents.

5 Claims, 1 Drawing Sheet

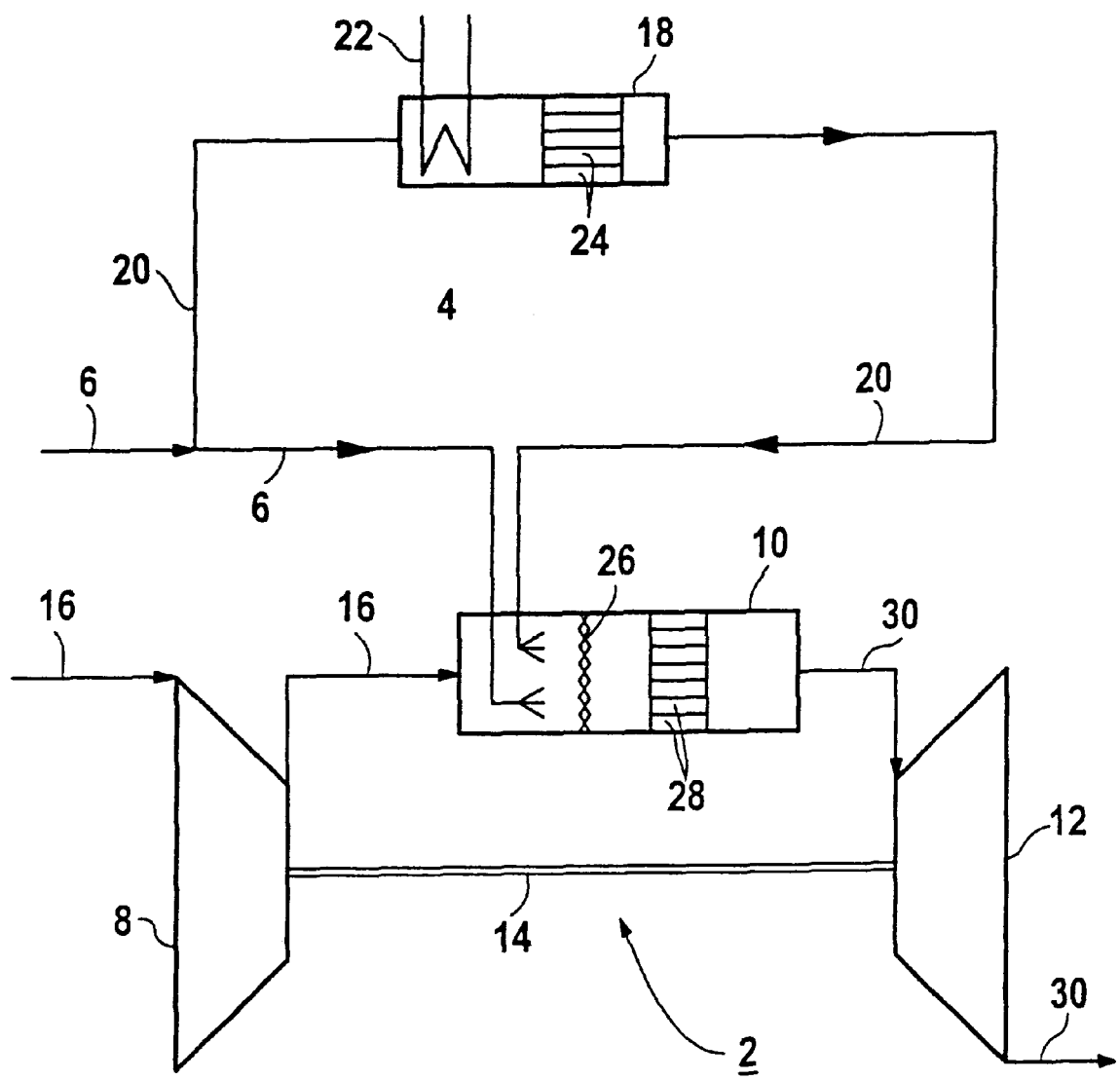

GAS TURBINE FOR THE COMBUSTION OF REFORMED FUEL GAS

CROSS-REFERENCE TO RELATED APPLICATION

This application is a continuation of International Application Ser. No. PCT/DE96/01018, filed Jun. 11, 1996 which designated the United States.

BACKGROUND OF THE INVENTION

FIELD OF THE INVENTION

The invention relates to a gas turbine for the combustion of a fuel gas.

A gas turbine conventionally includes a compressor part, a burner part and a turbine part. The compressor part and the turbine part are usually located on a common shaft which, at the same time, drives a generator for generating electricity. Preheated fresh air is compressed in the compressor part to the pressure necessary in the burner part. The compressed air and preheated fresh air are burnt together with a fuel, such as natural gas or petroleum, for example, in the burner part. The hot burner exhaust gas is fed to the turbine part and is expanded there.

Detailed information on the structure and use of gas turbines is provided in the company publication entitled "Gasturbines and Gasturbine Power Plants" of Siemens A G, May 1994, Order Number A 96001-U 124-A 259-V 1-7600.

The combustion of the compressed and preheated fresh air together with the fuel gas also gives rise to nitrogen oxides $NO_x$ which are particularly undesirable combustion products. Those nitrogen oxides, along with sulfur dioxide, are the main cause of the environmental problem of acid rain. Consequently, as well as in view of strict statutory norms on limit values for the emission of $NO_x$, the aim is to keep the $NO_x$ emission of a gas turbine particularly low and, at the same time, to avoid appreciably influencing the power of the gas turbine.

Thus, for example, the lowering of the flame temperature in the burner part has the effect of reducing the nitrogen oxides. In that case, steam is added to the fuel gas or to the compressed and preheated fresh air, or water is injected into the combustion space.

Such measures, which per se decrease the emission of nitrogen oxides from the gas turbine, are referred to as primary measures for the reduction of nitrogen oxides.

Accordingly, all those measures are referred to as secondary measures in which nitrogen oxides contained in the exhaust gas of a gas turbine or even fundamentally of a combustion process are decreased through the use of subsequent measures.

In that respect, the method of selective catalytic reduction (SCR) has gained acceptance throughout the world. In that method, the nitrogen oxides, together with a reducing agent, usually ammonia, are brought into contact with a catalyst and, in that process, form nitrogen and water. The use of that technology therefore necessarily entails the consumption of reducing agent. The catalytic converters, which are disposed in the exhaust-gas duct for reducing the nitrogen oxides, naturally bring about a pressure drop in the exhaust-gas duct and that pressure drop is accompanied by a power drop in the turbine. Even a power drop amounting to a few points per thousand, in the case of a gas turbine power of 150 MW, for example, and in the case of the current-purchasing price of about $0.016/kWh (and about 0.15 DM/kWh in Germany, for example) for current, has a serious effect on the result which can be achieved with such an apparatus.

Recent considerations with regard to the construction of the burner part tend towards replacing the normally used diffusion burner or swirl-stabilized premixing burner with a catalytic combustion chamber. Lower emissions of nitrogen oxides are achieved through the use of a catalytic combustion chamber than is possible with the above-mentioned burner types. The known disadvantages of the SCR method (large catalyst volumes, consumption of the reducing agent, high pressure loss) can thereby be overcome.

One disadvantage of a catalytic combustion chamber and likewise of a conventional combustion chamber is the ignition temperature which is necessary for combustion and which, if natural gas is used, is in the region of a value of about 400° C. This fact too closely restricts the operating range of the combustion chamber in a gas turbine and makes it necessary to use an auxiliary burner which naturally constitutes a source of nitrogen oxide.

In that respect, it is known from U.S. Pat. No. 5,048,284 to separate part of the fuel gas from the remaining fuel gas and to guide it through a catalytic reformer. In that case, according to the reforming process, methane and water are in equilibrium with hydrogen and carbon monoxide, so that part of the methane is converted into hydrogen. In that case, the fuel gas is either methane or a higher alkane which is decomposed to form methane. The reformed fuel gas is subsequently fed to the fuel gas again, with hydrogen alone leading to a lowering of the ignition temperature. Moreover, the reaction rate of the reforming process is relatively low.

SUMMARY OF THE INVENTION

It is accordingly an object of the invention to provide a gas turbine for the combustion of a fuel gas, which overcomes the hereinafore-mentioned disadvantages of the heretofore-known devices of this general type and which even better catalytically reforms that part of the fuel gas which is guided through a catalytic stage, by lowering an ignition temperature and without the use of an auxiliary burner.

With the foregoing and other objects in view there is provided, in accordance with the invention, a gas turbine for the combustion of a fuel gas, comprising a preforming catalytic stage having a catalyst system for converting a hydrocarbon contained in fuel gas into at least one of an alcohol and an aldehyde; and a conduit system for drawing off a part of a fuel gas flow, guiding the part of the fuel gas flow through the catalytic stage and subsequently feeding the part of the fuel gas flow back to the remaining fuel gas flow for lowering a catalytic ignition temperature of the fuel gas flow.

In this way, in contrast to the reforming process, in the preforming step the drawn-off part stream of fuel is decomposed into alcohol and/or aldehyde which are catalytically easily combustible materials. At the same time, as a result of unavoidable secondary reactions, other materials such as hydrogen, for example, are also formed. The preformed part stream of fuel gas is fed again to the remaining stream of fuel gas, so that the mixture produced in this way has a lower ignition temperature than is the case with the original fuel gas, such as natural gas, for example. In this case, the above-mentioned partly oxidized compounds alcohol and aldehyde, as well as hydrogen, additionally lead to a lowering of the ignition temperature and consequently to a reduction of nitrogen oxides in the exhaust gas of a gas turbine, which reduction is improved in relation to the prior art. On one hand, the feed of this preformed part stream of fuel gas for lowering the ignition temperature of the fuel gas means that the preformed part stream of fuel gas is first fed to the fuel gas and is subsequently mixed with the compressor air. On the other hand, however, there can also be a provision for feeding the preformed part stream of fuel gas to a gas mixture which is formed of the compressor air and of the remaining part stream of fuel gas. The comparatively easily igniting gas mixtures which are thereby obtained have an ignition temperature in the range of 200 to 350° C. depending on the quantity of the drawn-off and subsequently preformed part stream of fuel gas.

In accordance with another feature of the invention, in order to provide particularly good preforming of the drawn-off part stream of the fuel gas, the preforming stage includes a preheating device for the part stream of fuel gas, in the direction of flow of the part stream of the fuel gas. The preheating device can be provided, in particular, when the part stream of fuel gas enters the preforming stage without being preheated. A temperature of the part stream of fuel gas at the entrance of the catalyst system, which is a temperature that is advantageous for subsequent preforming in the catalyst system, can be in the region of about 100° C.

In accordance with a further feature of the invention, the catalyst system includes a honeycomb and/or plate-type catalyst which is essentially formed of titanium dioxide $TiO_2$ and which includes at least one transition-metal oxide and/or at least one precious metal. This is particularly advantageous for the conversion of hydrocarbons into alcohols and/or aldehydes. Transition-metal oxides are, in particular, the oxides of the $3d$ series and the $4f$ series (lanthanoides, rare-earth metals) in the periodic system of elements. Suitable precious metals are, in particular, rhodium, iridium, palladium and platinum. Particularly suitable are molybdenum oxide, tungsten oxide, vanadium oxide, chromium oxide, iron oxide, cerium oxide, manganese oxide, nickel oxide and cobalt oxide. Furthermore, metal oxides of the spinel type of the above-mentioned metals and metal oxides can also be used.

In accordance with an added feature of the invention, a maximum of 25% by volume of the fuel gas is drawn off and is subsequently guided through the preforming stage. This limitation defines a preferred range, in which the outlay (catalyst volume) and the benefit (catalytic lowering of ignition temperature) balance one another out.

In accordance with a concomitant feature of the invention, there is provided a catalytic combustion chamber.

Other features which are considered as characteristic for the invention are set forth in the appended claims.

Although the invention is illustrated and described herein as embodied in a gas turbine for the combustion of a fuel gas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a schematic circuit diagram of a gas turbine with a conduit system according to the invention.

DESCRIPTION OF THE PREFERRED EMBODIMENTS

Referring now in detail to the single figure of the drawing, there is seen a schematic representation of a gas turbine 2 with a conduit system 4 for achieving a comparatively low catalytic ignition temperature of a fuel gas 6. The gas turbine includes a compressor part 8, a catalytic combustion chamber 10 and expansion part 12. The compressor part 8 and the expansion part 12 are disposed on a common shaft 14, through which a non-illustrated generator is driven for the purpose of generating electricity. The compressor part 8 compresses preheated air 16 to an inlet pressure of the catalytic combustion chamber 10. In the exemplary embodiment, the fuel gas 6 is natural gas. Through the use of the conduit system 4, part of the fuel gas 6, in this case about 15% by volume, is fed to a preforming stage 18 as a part stream 20 of fuel gas. The remaining fuel gas 6 is fed directly to the catalytic combustion chamber 10.

The part stream 20 of fuel gas is first heated to about 100° C. in the preforming stage 18 through the use of a heat exchanger 22. The heated part stream 20 of fuel gas subsequently flows through honeycomb catalytic converters 24 which are formed essentially of titanium dioxide and which include a mixture of vanadium oxide, tungsten oxide, molybdenum oxide, platinum and rhodium. By virtue of the catalytic effect of the honeycomb catalytic converters 24, most of the part stream 20 of fuel gas is preformed, that is to say catalytically easily igniting materials, alcohol, aldehyde and hydrogen, form from the natural gas 6. The part stream 20 of fuel gas which is preformed in this way is likewise fed to the catalytic combustion chamber 10.

In the catalytic combustion chamber 10, the fuel gas 6, the preformed part stream 20 of fuel gas and the preheated and compressed air 16 are intermixed through the use of a mixing element, for example a static mixer 26, and are subsequently fed to suitable catalytic converters, in this case honeycomb catalytic converters 28. The honeycomb catalytic converters 28 have a particularly strong oxidizing effect for the catalytic combustion of the fuel gas 6, the part stream 20 of fuel gas and the preheated compressed air 16. In the exemplary embodiment, the honeycomb catalytic converters 28 have titanium dioxide $TiO_2$ as a basic material and include platinum, rhodium, iridium as well as cerium oxide and chromium oxide as catalytically active components. The above-mentioned precious metals are each present at 1% by weight and the above-mentioned metal oxides are each present at 3% by weight in the honeycomb catalytic converters 28. However, other compositions of the catalytically active components are also possible.

Due to the preforming of the part stream 20 of the fuel gas, the gas mixture which is mixed through the use of the static mixer 26 ignites as early as at a temperature of about 250° C. and subsequently burns completely in the honeycomb catalytic converters 28. Hot burner exhaust gas 30 entering the expansion part from the catalytic combustion chamber 10 has a temperature of about 1100° C. and is expanded in the expansion part 12. After the burner exhaust gas 30 has been expanded, it is fed to a non-illustrated wasteheat steam generator. Due to the comparatively low catalytic ignition temperature of the gas mixture burnt in the catalytic combustion chamber 10, the use of an auxiliary burner, which generates a supporting or pilot flame, can be dispensed with completely. Such an auxiliary burner is therefore also ruled out as a source of nitrogen oxide, so that the burner exhaust gas 30, when it emerges from the expansion part 12, has a comparatively low nitrogen oxide content.

We claim:

1. A gas turbine for the combustion of a fuel gas comprising;

a compressor part;

a combustion chamber connected to said compressor part;

an expansion part connected to said combustion chamber;

a preforming catalytic stage having a catalyst system with a catalytic converter formed essentially of titanium dioxide and including a substance selected from the group consisting of at least one transition-metal oxide and at least one precious metal for converting a hydrocarbon contained in fuel gas into at least one of an alcohol and an aldehyde; and a conduit system for drawing off a part of a fuel gas flow, guiding the part of the fuel gas flow through said catalytic stage and subsequently feeding the part of the fuel gas flow back to the fuel gas flow for lowering a catalytic ignition temperature of the fuel gas flow.

2. The gas turbine according to claim 1, wherein said preforming stage includes a preheating device for the part of the fuel gas flow, in a flow direction of the part of the fuel gas flow.

3. The gas turbine according to claim 1, wherein said catalytic converter is at least one of a honeycomb and a plate-type catalytic converter.

4. The gas turbine according to claim 1, wherein said conduit system draws off and guides a maximum of about 25% by volume of the fuel gas flow through said preforming stage.

5. The gas turbine according to claim 1, including a catalytic combustion chamber receiving the fuel gas flow.

* * * * *

UNITED STATES PATENT AND TRADEMARK OFFICE
CERTIFICATE OF CORRECTION

PATENT NO : 5,904,040
DATED : May 18, 1999
INVENTOR(S): Erich Hums et al.

It is certified that error appears in the above-identified patent and that said Letters Patent is hereby corrected as shown below:

On the title page add,
Item [30] should read as follows:

June 12, 1995        [DE]        Germany ...... 195 21 308.4

Signed and Sealed this

Fourth Day of April, 2000

Q. TODD DICKINSON

*Attest:*

*Attesting Officer*        *Director of Patents and Trademarks*